(12) United States Patent
Hwang

(10) Patent No.: US 8,180,316 B2
(45) Date of Patent: May 15, 2012

(54) AUTOMATIC ROUTING OF IN-VEHICLE EMERGENCY CALLS TO AUTOMATIC CRASH NOTIFICATION SERVICES AND TO PUBLIC SAFETY ANSWERING POINTS

(75) Inventor: Kuen-Yih Hwang, Naperville, IL (US)

(73) Assignee: West Corporation, Omaha, NE (US)

( * ) Notice: Subject to any disclaimer, the term of this patent is extended or adjusted under 35 U.S.C. 154(b) by 616 days.

(21) Appl. No.: 11/754,449

(22) Filed: May 29, 2007

(65) Prior Publication Data

US 2007/0287409 A1  Dec. 13, 2007

Related U.S. Application Data

(60) Provisional application No. 60/804,454, filed on Jun. 12, 2006.

(51) Int. Cl.
*H04M 11/04* (2006.01)

(52) U.S. Cl. .............. 455/404.1; 455/404.2; 455/414.1; 455/445; 379/111

(58) Field of Classification Search .............. 455/404.1, 455/414.1; 379/111, 45, 37
See application file for complete search history.

(56) References Cited

U.S. PATENT DOCUMENTS

| | | | |
|---|---|---|---|
| 2003/0109245 A1* | 6/2003 | McCalmont et al. | 455/404 |
| 2004/0105529 A1* | 6/2004 | Salvucci et al. | 379/45 |
| 2004/0192271 A1* | 9/2004 | Eisner et al. | 455/414.1 |
| 2004/0203569 A1* | 10/2004 | Jijina et al. | 455/404.1 |
| 2005/0053209 A1* | 3/2005 | D'Evelyn et al. | 379/111 |
| 2007/0086578 A1* | 4/2007 | Hansen et al. | 379/45 |

* cited by examiner

*Primary Examiner* — Anthony Addy
*Assistant Examiner* — Shahriar Behnamian

(57) ABSTRACT

A system and method automatically routes in-vehicle emergency calls to an automatic crash notification (ACN) call center using information provided by the calling mobile device in the call set up message. An operator at the ACN call center is presented with an identification of a public safety answering point (PSAP) that serves the location of the vehicle. The ACN operator may then conference in the PSAP if needed. The provided information is displayed at both the ACN operator's position and at the PSAP. Alternatively, the call is routed to the PSAP first or to both the PSAP and the ACN call center simultaneously.

16 Claims, 4 Drawing Sheets

AUTOMATIC ROUTING OF IN-VEHICLE EMERGENCY CALLS TO AUTOMATIC CRASH NOTIFICATION SERVICES AND TO PUBLIC SAFETY ANSWERING POINTS

CROSS-REFERENCE TO RELATED APPLICATION

This patent application is related to and claims the benefit of the filing date of U.S. Provisional Patent Application No. 60/804,454 entitled "Automatic Routing of In-Vehicle Emergency Calls to Automatic Crash Notification Services and to Public Safety Answering Points," which was filed on Jun. 12, 2006 by Kuen-Yih Hwang, and which is incorporated herein by reference in its entirety.

BACKGROUND OF THE INVENTION

The present invention is directed to routing of in-vehicle emergency calls, both manual and automatic, to both an automatic crash notification service and a public safety answering point. More specifically, this invention relates to a system and method that routes in-vehicle emergency calls to an automatic crash notification service and a public safety answering point that are both proximal to the origin of the call.

Efforts are being made, particularly in Europe, to improve in-vehicle emergency call service. Specifically, European Telecommunications Standard Institute/OCG EMTEL #9 (27.10.2004) provides for defined information to be delivered in an in-vehicle emergency call setup message. Such information includes:
  Header
  Time stamp
  Precise location
  eCall qualifier
  Vehicle identification
  Service provider identifier This information is herein referred to as the "eCall information." The header of the eCall information indicates whether the call is placed manually, automatically or is a "Good Samaritan" call. The time stamp gives the approximate time the call is placed. The "precise location" field gives the X/Y coordinates of the vehicle, which is derived from an in-vehicle Global Positioning System (GPS). The "eCall qualifier" indicates which of the one or more vehicle sensors is or are active (e.g., front impact, side impact, etc.). "Vehicle identification" is self-explanatory. "Service provider identifier" identifies the notification service subscribed to for this vehicle (telephone number or IP address).

The object of this effort is to deliver the above-defined information to a public safety answering point (PSAP) that handles the call and thus enhance the information available to the PSAP operator. However, the in-vehicle emergency call is first routed to a public telephone operator who manually selects a PSAP or an automatic crash notification service, even if the operator cannot verbally communicate with the vehicle occupants. The operator then causes the call to be routed to the selected PSAP. The eCall information is then delivered via a separate channel to the PSAP and displayed on the PSAP operator's terminal.

Such manual operator intervention, however, slows the delivery of the call to both the PSAP and the automatic crash notification system. As is known in the art, emergency calls need to be routed as quickly as possible to the answering point or answering points in order to provide aid as quickly as possible.

SUMMARY OF THE INVENTION

This problem is solved and a technical advance is achieved in the art by a system and method that automatically routes in-vehicle emergency calls to an automatic crash notification (ACN) call center using the eCall information. An operator at the ACN call center is presented with an identification of a public safety answering point (PSAP) that serves the location of the vehicle. The ACN operator may then conference in the PSAP if needed. The eCall information is displayed at both the ACN operator's position and at the PSAP. Alternatively, the call is routed to the PSAP first or to both the PSAP and the ACN call center simultaneously.

In accordance with a method embodiment of this invention, a serving mobile switching center (MSC) recognizes an emergency call from the dialed digits (e.g., 9-1-1, 1-1-2, 1-1-0, etc., or by identifying one of a limited number of telephone numbers of ACN service providers). Contrary to the prior art, however, the MSC queries an emergency location center in accordance with this invention by forwarding the eCall information. The emergency location center decodes the eCall information from the call setup message. The emergency location center determines which PSAP serves the location of the vehicle that made the call using the location field (X/Y) of the eCall information. Further, the emergency location center determines whether there is an ACN center that serves the location of the vehicle. The emergency location center stores the eCall information relative to, for example, the calling party number for further use.

The emergency location center directs the MSC to deliver the call to selected ACN center via, for example, the public switched telephone network (PSTN). When the ACN center receives the call, it queries the emergency location center for the identification of the PSAP that serves the location of the vehicle that made the call. If necessary, the operator at the ACN center can then initiate a multi-way call among the PSAP, the ACN and the in-vehicle mobile device. The PSAP may also query the emergency location center for the eCall information.

Alternatively, the emergency location center may set up a multi-way call among the PSAP, the ACN center and the in-vehicle telephone automatically, in order to further reduce call set up time.

In this manner, automatic and manual in-vehicle emergency calls are routed accurately and quickly to the answering points most proximal to the location of the vehicle from which the call was received.

BRIEF DESCRIPTION OF THE DRAWINGS

A more complete understanding of this invention may be obtained from a consideration of this specification taken in conjunction with the drawings, in which.

DETAILED DESCRIPTION

The specific embodiments of this invention are described in reference to the eCall information described in European Telecommunications Standard Institute/OCG EMTEL #9 (27.10.2004), which is incorporated herein by reference in its entirety. One skilled in the art will realize after studying this specification that any information that a mobile device can provide will expedite special number calls in general, and emergency calls specifically. For example, if GPS information cannot be provided by the mobile device, other information, previously used in the art (e.g., cell and sector) is used to route the call. However, an emergency location center may override a selected call center based on other information delivered from the mobile device. Such information may include the use or purpose of the vehicle (e.g., military, police, hazardous waste transport, etc.), which may require processing by a specific call center or PSAP. Further, the emergency location center may use the dialed number or information provided by the mobile unit as an indication of language requirement. The emergency location center overrides the usual routing with special routing to an operator that understands that language.

Figure 1:
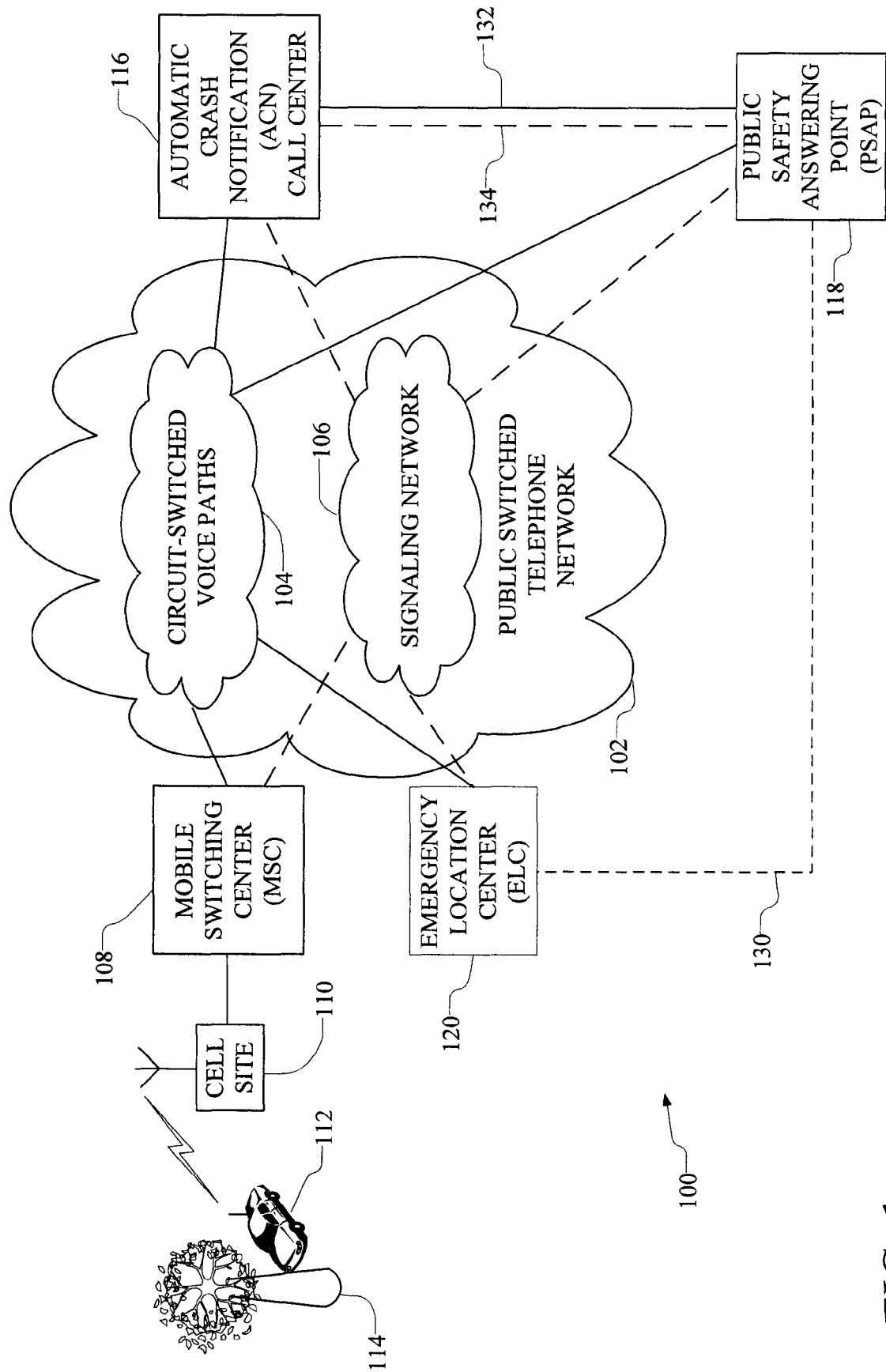
FIG. 1 depicts a communications network in accordance with an embodiment of the present invention.

With reference now to FIG. 1, a communications network 100 in accordance with an embodiment of the present invention is illustrated. In general, communications network 100 comprises the publicly switched telephone network (PSTN) 102. PSTN 102 generally comprises a plurality of circuit-switched voice paths 104 and a signaling network 106. In this exemplary embodiment, solid lines represent voice paths and dashed lines represent data paths. Other components, such as signal transfer points, tandem switching systems, local switching systems, selective routers, etc. are not illustrated in the communications network 100 of FIG. 1, are well known in the art, do not form part of this invention and are therefore not further discussed.

A mobile switching center (MSC) 108 is connected to PSTN 102 via both circuit-switched voice paths 104 and signaling network 106. As is known in the art, MSC 108 is part of public land mobile network (PLMN). PLMN is well known in the art, does not form a part of this invention and is thus not further illustrated or described. MSC 108 is connected to a plurality of cell sites, represented herein by cell site 110, either directly or via base station controllers (not shown, but well known in the art). Each cell site 110 supports telephony functions for a plurality of mobile communications devices, represented by in-vehicle mobile device 112.

The goal of an in-vehicle automatic crash notification (ACN) system is to provide assistance as quickly as possible in the event of an accident (such as hitting tree 114) or other triggering event, either manual or automatic. In such an ACN system, an ACN call center 116 is contacted via communications network 100. ACN call center may be a privately operated call center, a commercial call center or a public call center. There may be a plurality of call centers strategically located within a jurisdiction or there may be one call center that takes calls from a plurality of jurisdictions.

An emergency location center (ELC) 120 in accordance with an aspect of this invention is illustrated herein as connected to signaling network 106 in PSTN 102 and it may be also connected to circuit-switched voice paths 104 in PSTN 102. ELC 120 is discussed in more detail, below, in connection with FIGS. 3 and 4. ELC 120 may be part of PSTN 102 or may be connected to a data network (not shown but well known in the art) that is in communication with signaling network 106. One skilled in the art will appreciate that ELC 120 may be a stand-alone unit or may be a function operating on another network element, such as a network control point.

Finally, communications network 100 includes a plurality of public safety answering points, represented by public safety answering point (PSAP) 118. PSAP 118 is connected to PSTN 102 via a selective router (not shown but well known in the art) to both circuit-switched voice paths 104 and signaling network 106. Each PSAP 118 serves a predefined geographical area. Each PSAP 118 also has a predefined emergency services number (ESN) and some have a direct dial telephone number. The ESN identifies the PSAP to PSTN 102 for routing purposes. The direct dial telephone number is known as a "back door" into the PSAP for calls that are difficult or impossible to route to the proper PSAP via the ESN.

In accordance with one aspect of this exemplary embodiment, PSAP 118 is directly connected to ELC 120 via data line 130. In this manner, PSAP 118 may obtain location information, call-back telephone number, etc. directly from ELC 120. Further, PSAP 118 may be connected to ACN call center 116, which is represented by line 132, via a private network or data network using, for example, VoIP. PSAP 118 communicates with ACN call center 116 via circuit-switched voice paths 104 in PSTN 102. Alternatively, PSAP 118 and ACN call center 116 may be directly connected via voice paths 134.

Figure 2:
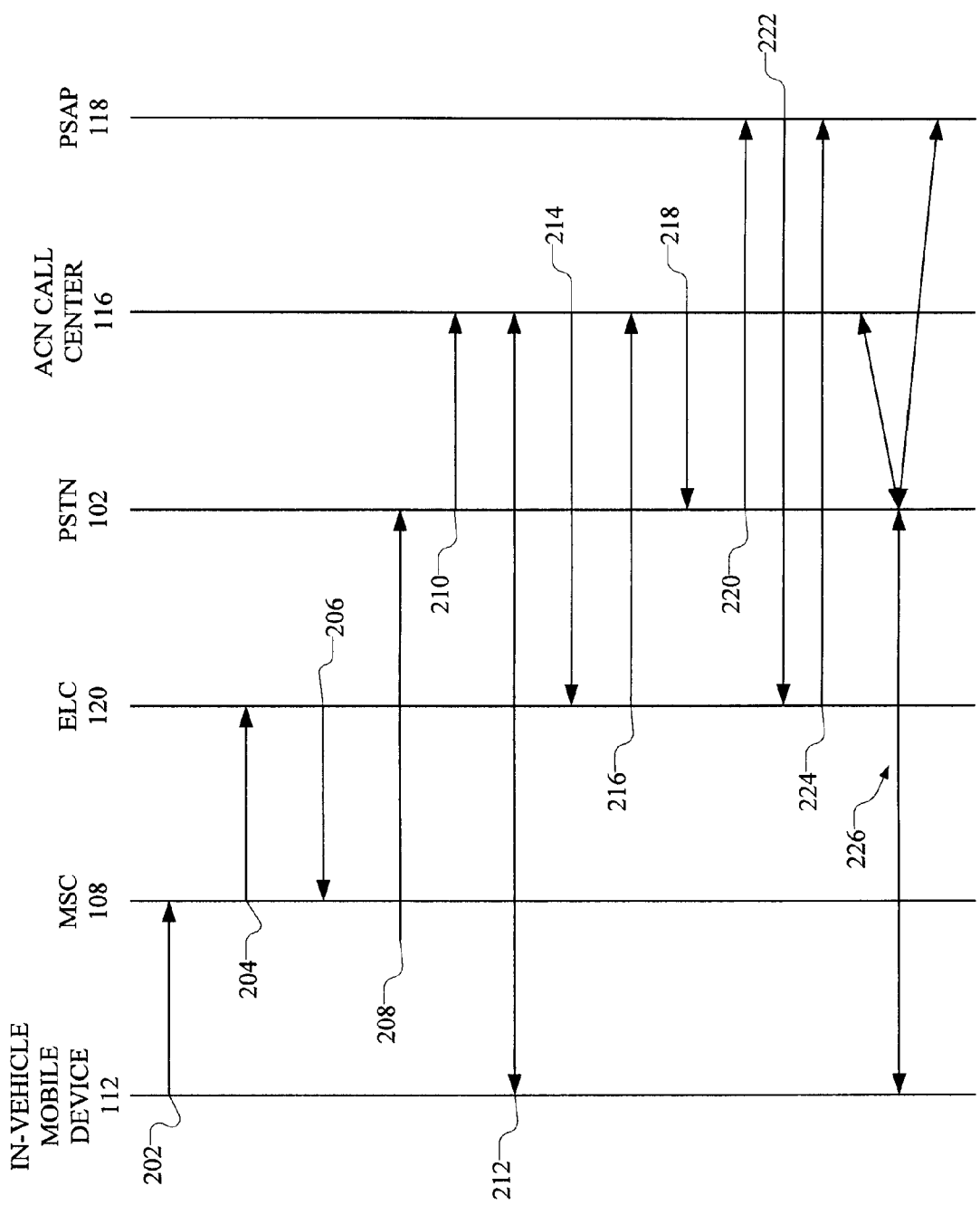
FIG. 2 depicts a call flow through the communications network of FIG. 1 in accordance with an embodiment of the present invention.

A method in accordance with this invention is now described by the call flow of FIG. 2 taken in conjunction with the communications network of FIG. 1. Processing starts at 202 when a call is made from in-vehicle mobile device 112. This call may be a manual call (i.e., placed by the driver or a passenger) or may be an automatic call (i.e., one or more sensors were triggered). The in-vehicle mobile device 112 sends information with the set up message in accordance with the eCall specification, cited above.

MSC 108 receives the call and determines that the call is an emergency call by comparing the dialed (also known as "called" and "destination") number with a list of emergency numbers. In accordance with one aspect of this invention, the list of emergency numbers includes not only the emergency number of the local jurisdiction (e.g., 9-1-1, 1-1-2, 1-1-0, etc.) but also may include the directory number of one or more ACN call centers 116.

Once MSC 108 has determined that the call is an emergency call, in step 204 MSC 108 queries ELC 120 for routing instructions. In one exemplary embodiment, MSC 108 sends ELC 120 a call setup message or a query message. For example, a call setup message may comprise an ISUP loopback message populated with the eCall information and a query message may comprise a GSM MAP or ANSI 41 MAP message. Any message transmitted includes the X/Y coordinates of in-vehicle mobile device 112. As will be described below, in connection with FIG. 3, ELC 120 queries a database to determine which ACN call center to direct the call to and which PSAP serves the location of in-vehicle mobile device 112. In step 206, ELC 120 returns the directory number of the selected ACN call center, the ESN (or directory number) of the serving PSAP or both, to MSC 108.

In this exemplary embodiment of this invention, MSC 108 routes the call to ACN call center 116 first. To this end, MSC 108 routes the call through PTSN 102 in step 208. PSTN 102 delivers the call to ACN call center 116 in step 210. A voice path is established at step 212.

Advantageously, as the call is being set up, a call setup message, such as an IAM message or a SETUP message, is delivered through signaling network 106 to ACN call center 116 that contains the eCall information, including the location of in-vehicle mobile device 112. Further advantageously, the ESN or directory number of the PSAP 118 is also delivered to ACN call center 116 in the origination message. Alternatively, ACN call center 116 queries ELC 120 for the location information, PSAP 118 number or other information in step 214. This step is necessary in some communications networks that do not have signaling networks or limited signaling networks. The query is sent over signaling network 106, a private data network or a public data network, such as the Internet (not shown but well known in the art).

ELC 120 responds, in step 216, with the requested information. In step 218, ACN call center 116 requests PSTN 102 to set up a three-way or conference call among MS 112, ACN call center 116 and PSAP 118. In step 220, PSTN 102 sets up a call to PSAP 118. In step 222, PSAP 118 requests information regarding calling in-vehicle mobile device 112 from ELC 120. This request may also be over signaling network 106, a dedicated link 130, a public data network or a private data network. In step 224, ELC 120 responds with the requested information. Finally, in step 226, a three-way call is established among in-vehicle mobile device 112, ACN call center 116 and PSAP 118.

Figure 3:
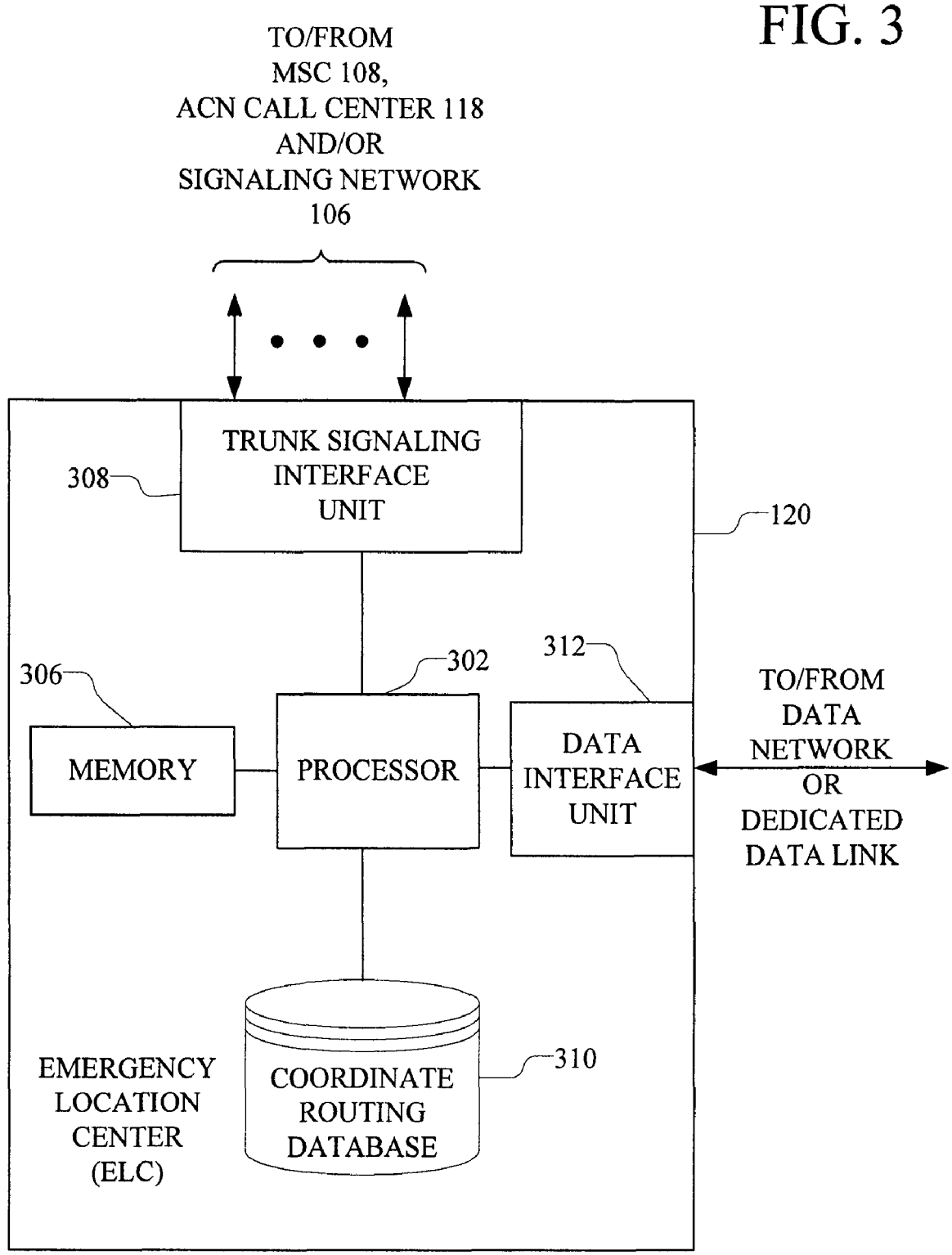
FIG. 3 is a block diagram of an emergency location center of FIG. 1 in accordance with an aspect of this invention.

Turning now to FIG. 3, a block diagram of an exemplary emergency location center (ELC) 112 is shown. At the heart of ELC 120 is a processor 302 that controls the various components using programs and data stored in memory 306. A trunk signaling interface unit 308 sends and receives signaling messages from MSC 108, signaling network 106 or both. Trunk signaling interface unit 308 delivers queries and data to processor 302. Processor 302 performs the translation of X/Y into ACN call center number and PSAP number by applying X/Y into coordinate routing database 310. The resulting telephone numbers, ESN or both are returned by processor 302 to trunk signaling inter face unit 308 for delivery. Optionally, a data network interface 312 may also be connected to processor and serves the same function as trunk signaling interface unit 308 for data messages.

Figure 4:
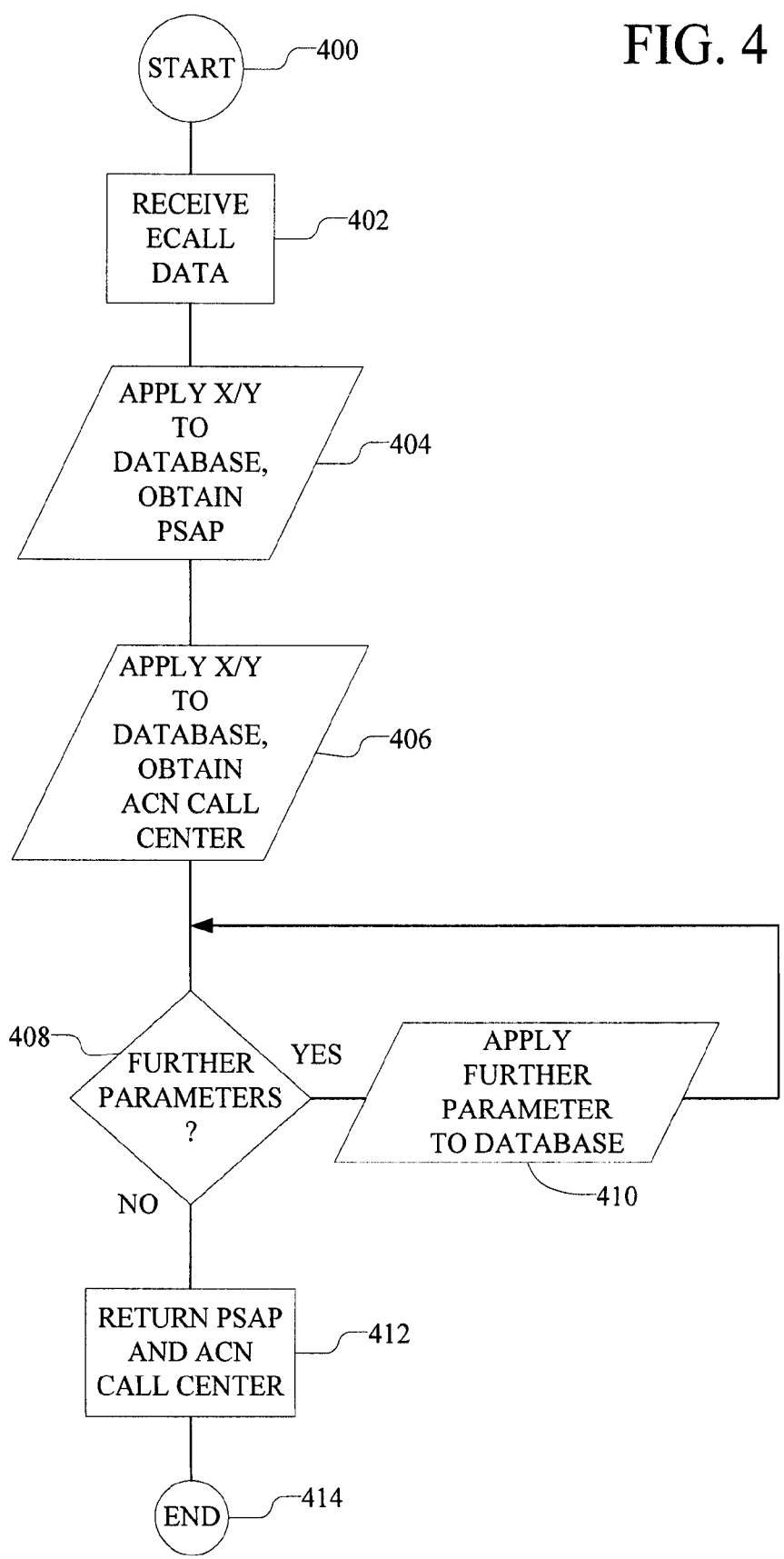
FIG. 4 is a flow chart of operations of an emergency location center of FIG. 3 in accordance with another aspect of this invention.

Turning now to FIG. 4, a flow chart of control of processor 302 in ELC 120 is illustrated. Processing starts in circle 400 and proceeds to action box 402. In action box 402, eCall information is received by processor 302 from trunk signaling interface unit 308 or data interface unit 312. In database process 404, the X/Y coordinates received in the eCall information are applied to coordinate routing database 310 to obtain an ESN or telephone number of the PSAP that serves the area in which the X/Y coordinates are located.

Processing continues to database process 406. In database process 406, the X/Y coordinates are applied to coordinate routing database 310 to obtain the telephone number of the ACN call center that serves the location of the calling in-vehicle communications device. Next, processing continues to decision diamond 408. In decision diamond 408, a determination is made whether there are further parameters to apply to a database. For example, if there is an indication of ACN call center different from the one obtained in step 406, then processing proceeds to database process 410 to obtain the telephone number. Alternatively, there may be an indication that the call originated from a government or other special vehicle. In this case, a special PSAP, ACN call center, or both may be required. Database process 410 obtains the required numbers.

Additionally, there may be parameters that indicate language spoken by the owner or driver of the vehicle. Database process 410 obtains the required numbers of an operator, a PSAP, an ACN call center, or all of these for specific languages. The dialed number may also be used as an override parameter related to language spoken. For example, if 9-1-1 is the dialed number, the caller probably speaks English, Spanish or French. If 1-1-0 is the dialed number, it is likely that the caller speaks Chinese. Thus, database process 410 may obtain a plurality of destination numbers before one is selected, based on a hierarchy of the further parameters.

When, in decision diamond 408, there are no other parameters to process, processing proceeds to action box 412. In action box 412, the PSAP data and ACN call center telephone number are returned to trunk signaling interface unit 308 or data interface unit 312. Processing ends in circle 414.

It is to be understood that the above-described embodiment is merely illustrative of the present invention and that may variations can be devised by one skilled in the art without departing from the scope of the invention. It is therefore intended that such variations be included within the scope of the following claims and their equivalents.

The invention claimed is:

1. A method for routing a wireless emergency call from an in-vehicle mobile device comprising:
 receiving a set up message from said in-vehicle mobile device via a wireless network at an emergency location center (ELC) coupled with said wireless network, said set up message including a plurality of parameters;
 (a) in no particular order:
 (1) determining a destination automatic crash notification (ACN) call center based on one or more of said parameters; and
 (2) determining a destination public safety answering point (PSAP) based on one or more of said parameters; and
 (b) routing said emergency call directly to said destination ACN call center without involving said destination PSAP, without attempting to involve said destination PSAP and without awaiting involvement of said destination PSAP; and routing said emergency call directly to said destination PSAP without involving said destination ACN call center, without attempting to involve said destination ACN call center and without awaiting involvement of said ACN call center;
 wherein, routing said emergency call to said destination ACN call center and said destination PSAP substantially simultaneously.

2. A method in accordance with claim 1 further comprising:
 one of said ELC, said destination ACN call center and said destination PSAP setting up a three-way call among said in-vehicle mobile device, said destination ACN call center and said destination PSAP.

3. A method in accordance with claim 1 further comprising:
 forwarding an identification of said destination PSAP from said destination ELC to said destination ACN call center responsive to a request from said destination ACN call center to said destination ELC.

4. A method in accordance with claim 1 further comprising:
 one of said ELC, said destination ACN call center and said destination PSAP setting up a three-way call among said in-vehicle mobile device, said destination ACN call center and said destination PSAP.

5. A method in accordance with claim 1 further comprising:
 determining a language based on said one or more parameters; and
 wherein determining a destination ACN call center is based on said language.

6. A method in accordance with claim 1 further comprising:
 determining a language based on said one or more parameters; and wherein determining a destination PSAP is based on said language.

7. A method for routing a wireless emergency call from an in-vehicle mobile device comprising:

receiving said wireless emergency call from said in-vehicle mobile device at an emergency location center; said wireless emergency call including a set up message; said set up message including a plurality of parameters; said parameters including an indication of location of said in-vehicle mobile device; said emergency location center including a database store; said database store containing information relating at least to purview and contact information for a plurality of automatic crash notification (ACN) call centers and for a plurality of public safety answering points (PSAP);

(a) in no particular order:
(1) determining a destination ACN call center based on one or more of said parameters; and
(2) determining a destination PSAP based on one or more of said parameters; and
(b) routing said emergency call directly to said destination PSAP without involving said destination ACN call center, without attempting to involve said destination ACN call center and without awaiting involvement of said destination ACN call center; and routing said emergency call directly to said destination ACN call center without involving said destination PSAP, without attempting to involve said destination PSAP and without awaiting involvement of said destination PSAP;

wherein, routing said emergency call to said destination ACN call center and said destination PSAP substantially simultaneously.

8. A method in accordance with claim 7 further comprising:
one of said emergency location center, said destination ACN call center and said destination PSAP setting up a three-way call among said in-vehicle mobile device, said destination ACN call center and said destination PSAP.

9. An emergency location center comprising:
a signaling interface unit coupled with a wireless communication network; said signaling interface unit being configured to receive a message from a calling unit via said wireless communication network; said message containing one or more first parameters; said one or more first parameters including location information relating to said calling unit;
a database configured to store a plurality of second parameters in relation to a plurality of destination public safety answering points (PSAP) and to a plurality of destination automatic crash notification (ACN) call centers; said plurality of second parameters including contact information relating to said plurality of destination PSAPs and to said plurality of destination ACN call centers; and
a processor coupled to said signaling interface unit and said database and configured to apply one or more of said one or more first parameters to said database to select at least one selected destination PSAP of said plurality of destination PSAPs and at least one selected destination ACN call center of said plurality of destination ACN call centers; said processor providing said contact information relating to said at least one selected destination PSAP and said contact information relating to said at least one selected destination ACN call center to said signaling interface unit; said signaling interface unit providing said contact information for routing said message directly to said at least one selected destination PSAP via said communication network without involving said at least one destination ACN call center, without attempting to involve said at least one selected destination ACN call center and without awaiting involvement of said at least one destination ACN call center; and routing said message directly to said at least one selected destination ACN call center via said communication network without involving said at least one selected destination PSAP, without attempting to involve said at least one selected destination PSAP and without awaiting involvement of said at least one selected destination PSAP;

wherein, said signaling interface unit provides said contact information appropriately to effect routing said message to at least one said selected destination PSAP and at least one said selected destination ACN call center substantially simultaneously.

10. An emergency location center in accordance with claim 9 wherein
at least one other communication network than said wireless communication network cooperates with said signaling interface unit to effect setting up a multi-party call among said calling unit, said at least one destination ACN call center and said at least one selected destination PSAP.

11. An emergency location center in accordance with claim 9 wherein
one of said parameters indicates language preference and said database comprises a language routing database.

12. An emergency location center in accordance with claim 11 wherein
said destination ACN call center is based on said language preference.

13. A system for routing a wireless emergency call from an in-vehicle mobile device; said emergency call including a plurality of parameters; said plurality of parameters including location of said in-vehicle mobile device; the system comprising:
(a) a wireless communication network configured for receiving and handling said emergency call;
(b) at least one automatic crash notification facility coupled with said wireless communication network;
(c) at least one public safety answering point coupled with said wireless communication network;
(d) an emergency location center coupled with said wireless communication network; said emergency location center including a database storing contact information relating to said at least one automatic crash notification facility and said at least one public safety answering point; said emergency location center responding to receiving said emergency call using at least one first selected parameter of said plurality of parameters to query said database to obtain said contact information relating to at least one selected automatic crash notification facility of said at least one automatic crash notification facility and at least one selected public safety answering point of said at least one public safety answering point; said emergency location center effecting routing said emergency call directly to said at least one selected automatic crash notification facility without involving said at least one selected public safety answering point, without attempting to involve said at least one selected public safety answering point and without awaiting involvement of said at least one selected public safety answering point; and to effect routing said emergency call directly to said at least one selected public safety answering point appropriate for said location of said in-vehicle mobile device without involving said at least one automatic crash notification facility, without attempting to involve said at least one selected automatic crash notification facility and without awaiting involvement of said at least one selected automatic crash notification;

wherein, said emergency location center effecting routing said emergency call to said at least one automatic crash notification facility and said at least one public safety answering point appropriate for said location of said in-vehicle mobile substantially simultaneously.

14. The system for routing an emergency call from an in-vehicle mobile device as recited in claim 13 wherein
at least one of said emergency location center, said at least one selected public safety answering point and said at least one selected automatic crash notification facility is configured for setting up a multi-party call among said calling unit, said at least one selected public safety answering point and said at least one selected automatic crash notification facility.

15. The system for routing an emergency call from an in-vehicle mobile device as recited in claim 13 wherein
said emergency location center further responds to receiving said emergency call using at least one second selected parameter of said plurality of parameters to query said database to determine a language used for conveying said emergency call, and wherein said language is at least partially regarded in effecting said routing said emergency call to at least one of said at least one selected automatic crash notification facility and said at least one selected public safety answering point appropriate for said location of said in-vehicle mobile.

16. The system for routing an emergency call from an in-vehicle mobile device as recited in claim 13 wherein
said emergency location center further responds to receiving said emergency call using at least one second selected parameter of said plurality of parameters to query said database to determine a language used for conveying said emergency call, and wherein said language is at least partially regarded in effecting said routing said emergency call to at least one of said at least one selected automatic crash notification facility and said at least one selected public safety answering point appropriate for said location of said in-vehicle mobile.

* * * * *